(12) United States Patent
Seon (10) Patent No.: US 8,432,649 B2
(45) Date of Patent: Apr. 30, 2013

(54) ABNORMAL CURRENT DETECTING CIRCUIT FOR CIRCUIT BREAKER

(75) Inventor: Jong Kug Seon, Gyeonggi-Do (KR)

(73) Assignee: LS Industrial Systems Co., Ltd., Gyeonggi-Do (KR)

( * ) Notice: Subject to any disclaimer, the term of this patent is extended or adjusted under 35 U.S.C. 154(b) by 320 days.

(21) Appl. No.: 12/778,345

(22) Filed: May 12, 2010

(65) Prior Publication Data

US 2010/0296220 A1  Nov. 25, 2010

(30) Foreign Application Priority Data

May 21, 2009  (KR) .................. 10-2009-0044691

(51) Int. Cl.
*H02H 7/085* (2006.01)
*H02H 9/02* (2006.01)

(52) U.S. Cl.
USPC .................. 361/45; 361/115; 361/42; 361/47

(58) Field of Classification Search .................. 361/115, 361/42, 45, 47
See application file for complete search history.

(56) References Cited

U.S. PATENT DOCUMENTS

| | | | |
|---|---|---|---|
| 4,347,540 A * | 8/1982 | Gary et al. | 361/47 |
| 5,001,439 A * | 3/1991 | Lopata et al. | 330/253 |
| 5,420,740 A * | 5/1995 | MacKenzie et al. | 361/45 |
| 6,667,892 B1 * | 12/2003 | Lin et al. | 363/49 |
| 7,365,571 B2 * | 4/2008 | Seo et al. | 326/83 |

FOREIGN PATENT DOCUMENTS

| | | |
|---|---|---|
| CN | 1042682 | 3/1999 |
| JP | 59-44921 | 3/1984 |
| JP | 3-256517 | 11/1991 |

OTHER PUBLICATIONS

Japan Office action, mail date is Jan. 17, 2012.
Chinese Office Action and an English translation thereof, dated Dec. 27, 2012.

* cited by examiner

*Primary Examiner* — Rexford Barnie
*Assistant Examiner* — Zeev V Kitov
(74) *Attorney, Agent, or Firm* — Greenblum & Bernstein, P.L.C.

(57) ABSTRACT

Disclosed herein is an abnormal current detection circuit for circuit breaker, comprising a full-wave amplifier, a positive wave-period comparator for comparing a positive wave-period amplification voltage signal with a positive wave-period reference voltage signal to output a pulse signal, a negative wave-period comparator for comparing a negative wave-period amplification voltage signal with a negative wave-period reference voltage signal to output a pulse signal, a combining circuit for combining pulse signals outputted from the positive wave-period comparator and the negative wave-period comparator to output a full-wave combining signal, a reference voltage generator for generating a reference voltage signal, and a comparative driving circuit section for comparing the combining signal with the reference voltage signal to output a signal for controlling a circuit breaker to be driven to a circuit breaking position when the combining signal is greater or equal to the reference voltage signal.

4 Claims, 4 Drawing Sheets

ABNORMAL CURRENT DETECTING CIRCUIT FOR CIRCUIT BREAKER

CROSS-REFERENCE TO A RELATED APPLICATION

Pursuant to 35 U.S.C. §119(a), this application claims the benefit of earlier filing date and right of priority to Korean Application No. 10-2009-0044691, filed on May 21, 2009, the contents of which is incorporated by reference herein in its entirety.

BACKGROUND OF THE INVENTION

1. Field of the Invention

The present invention relates to a circuit breaker, and more particularly, to an abnormal current detection circuit for circuit breaker configured to electrically detect an abnormal current in a circuit, thereby allowing the circuit breaker to break the circuit when the abnormal current flows in the circuit.

2. Description of the Conventional Art

A circuit breaker is a power device for detecting an abnormal current to automatically break the circuit, thereby protecting life, an electrical load device, and a circuit from an accident current in a power supply circuit between the power source and the load, when the abnormal current such as an over current, an electric shortage current, or the like is generated in the circuit. In such circuit breakers, an electric leakage circuit breaker is a circuit breaker having a function of breaking a circuit when detecting an electric leakage as well as the over current and electric shortage current, thereby protecting life, a load device, and a circuit from an accident current. The circuit breaker, as well known in the art, may include a trip mechanism for detecting an abnormal current in a circuit, and a switching mechanism for implementing a trip operation thereby separating a movable contactor from a stationary contactor to break the circuit triggered by the trip mechanism. The trip mechanism may be configured by comprising a trip coil for generating magnetic absorption force when magnetized by a driving current, and an armature to be rotated by the magnetic absorption force of the trip coil. The switching mechanism is configured by comprising a trip spring for providing the driving force of the trip (circuit break), a latch mechanism capable of being moved to a releasing position of the trip spring by the rotational pressure of the trigger mechanism or a locking position of the trip spring in an elastic energy charged state, and a power transmission mechanism for transmitting the elastic energy of the trip spring to the movable contactor to break a circuit.

The abnormal current detection circuit for circuit breaker performs a role of detecting an abnormal current in a circuit and providing an electrical driving signal to the trip coil when the abnormal current is detected.

In the abnormal current detection circuit for circuit breaker, an abnormal current detection circuit for circuit breaker according to the related art is configured with a circuit in which a current signal detected by a current transformer for each phase or zero-phase current transformer in case of an electric leakage circuit breaker is amplified using a half-wave amplifier, and compared with a predetermined reference value using a comparator to determine normality or abnormality, and a driving signal is outputted to the trip coil when abnormality is determined.

However, the abnormal current detection circuit for circuit breaker according to the related art is configured to amplify an input signal from the current transformer using a half-wave amplifier, and therefore, the detection of abnormal current generation may be promptly performed, or delayed by a half wave, i.e., 180 degrees, based on whether the phase of the input signal is started at 0 or 180 degrees. As a result, it may cause a detection delay, for instance, detection delay of maximum 10 ms (millisecond). Such a detection delay in a circuit breaker requiring a high-speed trip has a problem of resulting in the damage of load device, and circuit.

Furthermore, in the abnormal current detection circuit for circuit breaker according to the related art, when configuring the detection circuit thereof with a typical electronic device, the characteristics of the device may vary depending on temperature and production process speed variations, i.e., low-speed production, standard-speed production, and high-speed production, or the characteristics of an integrated circuit may vary in configuring the integrated circuit, thereby causing a problem that the reliable detection of an abnormal current cannot be provided, and the reliable operation of a circuit breaker cannot be guaranteed.

SUMMARY OF THE INVENTION

Accordingly, the objective of the present invention to solve the foregoing problem in the related art, and it is a first object of the present invention to provide an abnormal current detection circuit for circuit breaker capable of detecting an abnormal current at high speed without a delay time.

It is a second object of the present invention to provide a reliable abnormal current detection circuit for circuit breaker in which the characteristics of abnormal current detection does not sensitively vary depending on temperature and production process speed variations.

The foregoing object of the present invention may be accomplished by providing an abnormal current detection circuit for circuit breaker, comprising a full-wave amplifier for amplifying an alternating current (AC) input voltage signal corresponding to a full-wave AC input current subject to detection, outputting a positive wave-period amplification voltage signal and a negative wave-period amplification voltage signal, and generating a positive wave-period reference voltage signal and a negative wave-period reference voltage signal having a predetermined difference value with respect to the amplified AC input voltage signal;

a positive wave-period comparator connected to an output of the full-wave amplifier to compare the positive wave-period amplification voltage signal with the positive wave-period reference voltage signal provided from the full-wave amplifier, and output a pulse signal when the positive wave-period amplification voltage signal is greater than or equal to the positive wave-period reference voltage signal;

a negative wave-period comparator connected to an output of the full-wave amplifier to compare the negative wave-period amplification voltage signal with the negative wave-period reference voltage signal provided from the full-wave amplifier, and output a pulse signal when the negative wave-period amplification voltage signal is greater than or equal to the negative wave-period reference voltage signal;

a combining circuit connected to the positive wave-period comparator and the negative wave-period comparator to combine a pulse signal outputted from the positive wave-period comparator with a pulse signal outputted from the negative wave-period comparator to output a full-wave combining signal;

a reference voltage generator for generating a reference voltage signal to determine normality or abnormality of the input voltage signal corresponding to an AC input current subject to detection;

a capacitor connected to an output stage of the combining circuit to charge electric charges during the time period of outputting a pulse signal outputted from the combining circuit; and a comparative driving circuit section connected to the reference voltage generator and the capacitor to compare a charge voltage provided from the capacitor with a reference voltage signal provided from the reference voltage generator and output a signal for controlling a circuit breaker to be driven to a circuit breaking position when the charge voltage is greater or equal to the reference voltage signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

The objective of the present invention, as well as the configuration and operation thereof to accomplish the foregoing objective will be clearly understood by the following description for the preferred embodiments of present invention with reference to the accompanying drawings.

First, an overall circuit diagram illustrating an abnormal current detection circuit for circuit breaker according to the present invention and a power circuit in which a circuit breaker comprising the same is installed will be described with reference to FIG. 1.

The overall power circuit in which a circuit breaker is installed may be configured by comprising an alternating current (AC) source 100, a zero-phase current transformer (hereinafter, abbreviated as "ZCT") 102, a filter circuit 103, a resistor 101 for voltage forming, a direct-current (DC) converting power supply circuit section 104, an abnormal current detection circuit 200, a solid state switch (so called as semiconductor switch) SCR, a trip coil 300a, and a switching mechanism 300b.

The zero-phase current transformer 102 is a current detection means that can be configured in an embodiment to which an abnormal current detection circuit according to the present invention is applied. In a typical circuit breaker, the zero-phase current transformer 102 can be replaced with a typical current transformer, wherein the typical current transformer may be provided for each phase in case of a three-phase alternating current. In the overall power circuit, the remaining circuit sections excluding the zero-phase current transformer 102 may be commonly installed in both the typical circuit breaker and the electric leakage circuit breaker. Furthermore, in case of a typical three-phase AC circuit breaker, the remaining circuit sections excluding the zero-phase current transformer 102 may be provided by corresponding to each phase. The zero-phase current transformer 102 outputs a zero-phase current detection signal in proportion to a zero-phase current (i.e., leakage current) in a current flowing in a circuit in order to detect a leakage of the circuit.

The filter circuit 103, connected to the zero-phase current transformer 102, may be configured with a low-pass filter circuit in order to remove high-frequency noise that can be mixed into output signals in proportion to the detected leakage current outputted from the zero-phase current transformer 102.

The resistor 101 for voltage forming is a resistor for voltage forming by converting a zero-phase current detection signal into a voltage signal in a state that high-frequency noise is removed by the filter circuit 103.

The direct-current (DC) converting power supply circuit section 104 is an AC-DC conversion circuit for rectifying AC power and supplying DC power to a temperature compensating constant voltage circuit section 201 of the abnormal current detection circuit 200, which will be described later, and may be configured with a bridge diode, for instance.

The semiconductor switch SCR connected to an output stage of the abnormal current detection circuit 200, which will be described later, may be configured with, for instance, a thyrister that can be on/off-controlled by controlling the gate signal thereof, namely, silicon controlled rectifier (hereinafter, abbreviated as "SCR"), and also may be replaced by various solid state semiconductor switches.

The portion illustrated as a trip coil 300a represents the foregoing trip mechanism, substantially comprising a trip coil 300a, for triggering a switching mechanism 300b to a trip position, namely, circuit breaking position. The trip mechanism may be configured by comprising a trip coil for generating magnetic absorption force when magnetized by a driving current, and a trigger mechanism comprising an armature to be rotated by the magnetic absorption force of the trip coil.

The switching mechanism 300b, as described above, may be configured by comprising a trip spring for providing the driving force of the trip (circuit break), a latch mechanism that can be to a releasing position of the trip spring by the rotational pressure of the trigger mechanism or a locking position of the trip spring in an elastic energy charged state, a power transmission mechanism for transmitting the elastic energy of the trip spring to a movable contactor to break the circuit, and a stationary contactor and the movable contactor constituting a final switching contacting portion.

The abnormal current detection circuit 200 according to an embodiment of the present invention may be configured by comprising a full-wave amplifier 202, 205, a positive wave-period comparator 203, a negative wave-period comparator 204, a combining circuit 206, a second reference voltage generation circuit section 209, a capacitor CH, and a comparative driving circuit section 208.

The full-wave amplifier 202, 205 may be configured by comprising a full-wave amplification circuit section 202 and a first reference voltage generation circuit section 205. The detailed configuration and operation of the full-wave amplifier 202, 205 will be described with reference to FIG. 2, which is a detailed circuit diagram illustrating a full-wave amplifier of FIG. 1 according to an embodiment of the present invention.

Figure 2:
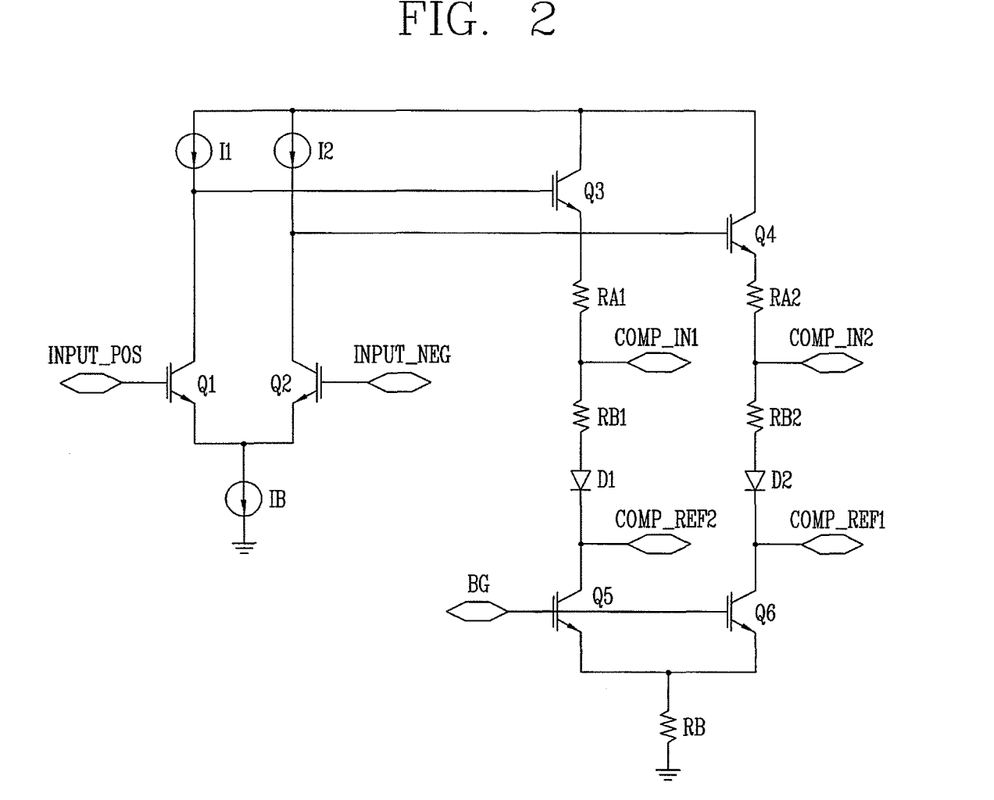
FIG. 2 is a detailed circuit diagram according to an embodiment of the present invention illustrating a full-wave amplifier of FIG. 1.

The full-wave amplification circuit section 202 may be configured by comprising a positive wave-period amplification circuit section and a negative wave-period amplification circuit section.

The positive wave-period amplification circuit section may be configured by comprising a first transistor Q1 in a differential amplifier circuit, i.e., the first transistor Q1 and a second transistor Q2 connected in parallel to each other, and a level shift circuit connected to a collector of the first transistor Q1. More specifically, the positive wave-period amplification circuit section may be configured by comprising a first transistor Q1 of the differential amplifier circuit to which a positive wave-period input signal of an AC input voltage signal is inputted through a positive wave-period input signal input stage INPUT_POS, and a level shift circuit comprising a third transistor Q3 in which a base thereof is connected to a collector of the first transistor Q1 and a resistor RA1 connected in series to the third transistor Q3. The positive wave-period amplification circuit section amplifies a positive wave-period input signal of an AC input voltage signal corresponding to a full-wave AC input current i.e., a portion having a positive value of a sine wave shaped AC input voltage signal having the positive value and negative value, to output to a positive wave-period comparator (refer to reference numeral 203 in FIG. 1) through a positive wave-period comparator input stage COMP_IN1. In other words, for a full-wave AC input current subject to detection detected and provided by the zero-phase current transformer 102 of FIG. 1, a portion having the positive value of the AC input voltage signal, which is converted and inputted as a voltage signal through the resistor 101 in a state that high-frequency noise is removed through the filter circuit 103, is amplified and outputted to a positive wave-period comparator (refer to reference numeral 203 in FIG. 1) through a positive wave-period comparator input stage COMP_IN1.

The negative wave-period amplification circuit section may be configured by comprising a second transistor Q2 in a differential amplifier circuit, i.e., the first transistor Q1 and the second transistor Q2 connected in parallel to each other, and a level shift circuit connected to a collector of the second transistor Q2. More specifically, the negative wave-period amplification circuit section may be configured by comprising a second transistor Q2 of the differential amplifier circuit to which a negative wave-period input signal of an AC input voltage signal is inputted through a negative wave-period input signal input stage INPUT_NEG, and a level shift circuit comprising a fourth transistor Q4 in which a base thereof is connected to a collector of the second transistor Q2 and a resistor RA2 connected in series to the fourth transistor Q4. The negative wave-period amplification circuit section amplifies a negative wave-period input signal inputted through a negative wave-period input signal input stage INPUT_NEG, i.e., a portion having a negative value of a sine wave shaped AC input voltage signal having a positive value and negative value, to output to a negative wave-period comparator (refer to reference numeral 204 in FIG. 1) through a negative wave-period comparator input stage COMP_IN2. In other words, for a full-wave AC input current detected and provided by the zero-phase current transformer 102 of FIG. 1, a portion having the negative value of the AC input voltage signal converted and inputted as a voltage signal through the resistor 101 in a state that high-frequency noise is removed through the filter circuit 103, is amplified and outputted to a negative wave-period comparator (refer to reference numeral 204 in FIG. 1) through a negative wave-period comparator input stage COMP_IN2. In FIG. 2, reference numerals I1 and I2 in a portion of the differential amplifier circuit designate collector currents flowing the first transistor Q1 and second transistor Q2 respectively, and reference numeral IB designates a bias current for driving the first transistor Q1 and second transistor Q2.

Figure 1:
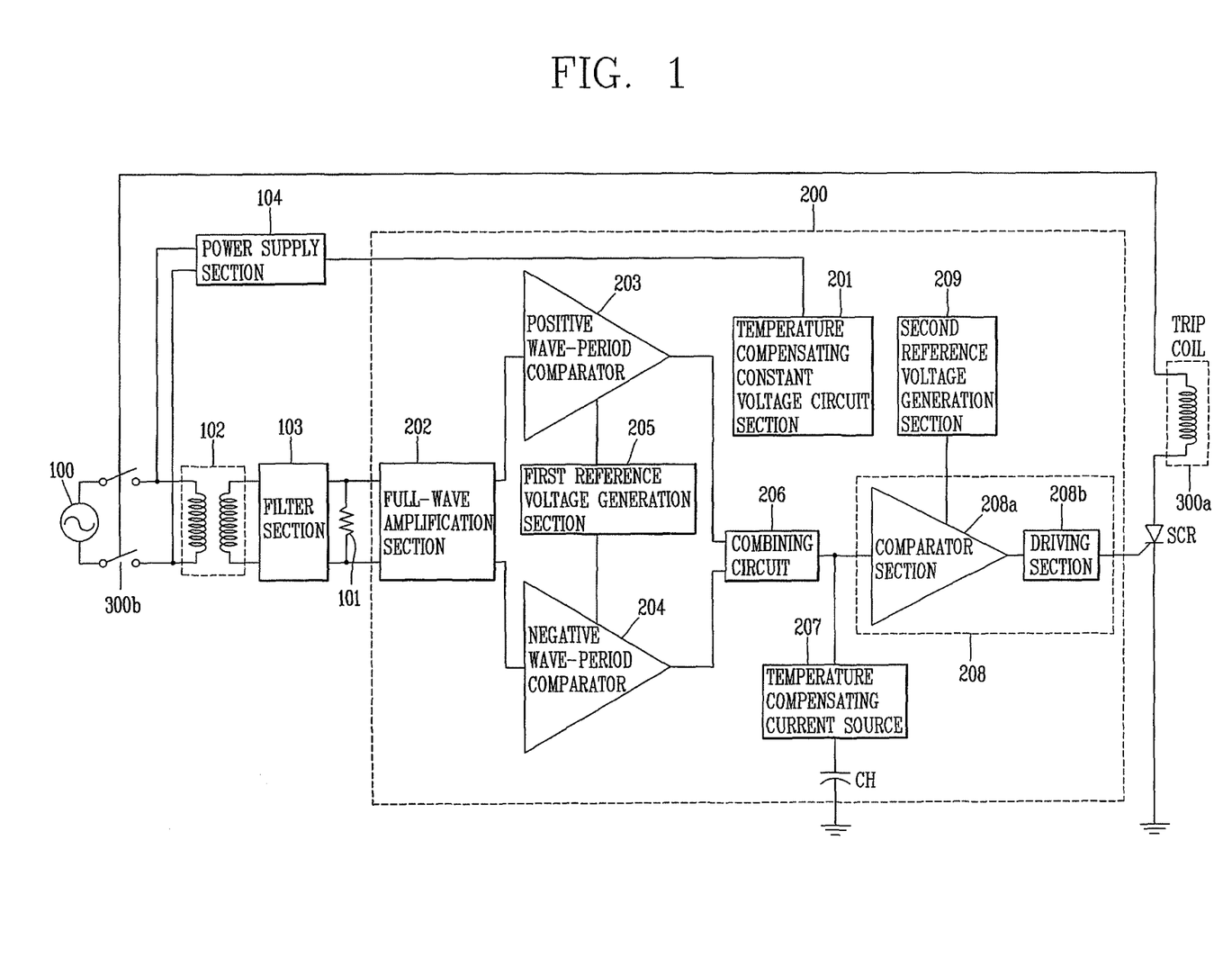
FIG. 1 is an overall circuit diagram illustrating a power circuit in which an abnormal current detection circuit for circuit breaker according to the present invention is installed.

In FIG. 2, a positive wave-period reference voltage generation circuit section and a negative wave-period reference voltage generation circuit section are included in the first reference voltage generation circuit section 205 illustrated in FIG. 1.

The positive wave-period reference voltage generation circuit section, connected to the negative wave-period amplification circuit section, may be configured by comprising a voltage divider circuit that provides a voltage signal having a predetermined difference value from a voltage value of the negative wave-period amplification signal outputted from the negative wave-period amplification circuit section. In other words, the positive wave-period reference voltage generation circuit section may be configured by comprising a voltage divider circuit section comprising a resistor RB2 and a diode D2 connected in series to the negative wave-period amplification circuit section, and a sixth transistor Q6 which is turned on or off to control switching of the conduction through the voltage divider circuit section. Accordingly, a voltage formed at the resistor RA2 of the level shift circuit section in the negative wave-period amplification circuit section is divided into a ratio of a resistance value of the resistor RB2 and of the diode D2 with respect to a combining resistance value of a resistance value of the resistor RB2 and the diode D2 in the voltage divider circuit section and a resistance value of the resistor RA2 in the level shift circuit section, and applied to a positive wave-period comparator (refer to reference numeral 203 in FIG. 1) through a positive wave-period comparator reference voltage input stage COMP_REF1.

The negative wave-period reference voltage generation circuit section, connected to the positive wave-period amplification circuit section, may be configured by comprising a voltage divider circuit that provides a voltage signal having a predetermined difference value from a voltage value of the positive wave-period amplification signal outputted from the positive wave-period amplification circuit section. In other words, the negative wave-period reference voltage generation circuit section may be configured by comprising a voltage divider circuit section comprising a resistor RB1 and a diode D1 connected in series to the positive wave-period amplification circuit section, and a fifth transistor Q5 which is turned on or off to control switching of the conduction through the voltage divider circuit section. Accordingly, a voltage formed at the resistor RA1 of the level shift circuit section in the positive wave-period amplification circuit section is divided into a ratio of a resistance value of the resistor RB1 and of the diode D1 with respect to a combining resistance value of a resistance value of the resistor RB1 and the diode D1 in the voltage divider circuit section and a resistance value of the resistor RA2 in the level shift circuit section, and applied to a negative wave-period comparator (refer to reference numeral 204 in FIG. 1) through a negative wave-period comparator reference voltage input stage COMP_REF2.

As described above, according to an embodiment of the present invention, the positive wave-period reference voltage generation circuit section and the negative wave-period reference voltage generation circuit section are crossly connected to the negative wave-period amplification circuit section and the positive wave-period amplification circuit section, thereby allowing the positive wave-period reference voltage generation circuit section to be connected to the negative wave-period amplification circuit section and allowing the negative wave-period reference voltage generation circuit section to be connected to the positive wave-period amplification circuit section.

According to a preferred characteristic of the present invention, as illustrated in FIG. 2, even if process speed or temperature varies, a voltage value of the positive wave-period amplification signal outputted from the positive wave-period amplification circuit section and a voltage value of the positive wave-period reference voltage signal outputted from the positive wave-period reference voltage generation circuit section will have a predetermined difference value. For that purpose, it is configured that the AC input voltage signal is inputted to the positive wave-period amplification circuit section, and an AC input voltage signal for which the positive wave-period amplification voltage signal outputted from the positive wave-period amplification circuit section is divided to have a predetermined voltage difference is inputted to the positive wave-period reference voltage generation circuit section.

Also, a voltage value of the negative wave-period amplification signal outputted from the negative wave-period amplification circuit section and a voltage value of the negative wave-period reference voltage signal outputted from the negative wave-period reference voltage generation circuit section will have a predetermined difference value. For that purpose, it is configured that the AC input voltage signal is inputted to the negative wave-period amplification circuit section, and an AC input voltage signal for which the negative wave-period voltage signal outputted from the negative wave-period amplification circuit section is divided to have a predetermined voltage difference is inputted to the negative wave-period reference voltage generation circuit section.

In other words, typically, the reference voltage of the comparator is a predetermined DC voltage while the reference voltage applied to the positive wave-period comparator (refer to reference numeral 203 in FIG. 1) and negative wave-period comparator (refer to reference numeral 204 in FIG. 1) is an AC input voltage signal having a predetermined difference value from the voltage of the positive wave-period amplification voltage signal or negative wave-period amplification voltage signal. As a result, a reliable comparative output may be provided even in case of process speed or temperature variation, and furthermore, such a characteristic may show an effect of outputting a reliable trip coil driving signal even in case of process speed or temperature variation, as well as an effect of enhancing the reliability of a circuit break operation (trip operation) due to abnormal current detection of the circuit breaker.

Figure 5:
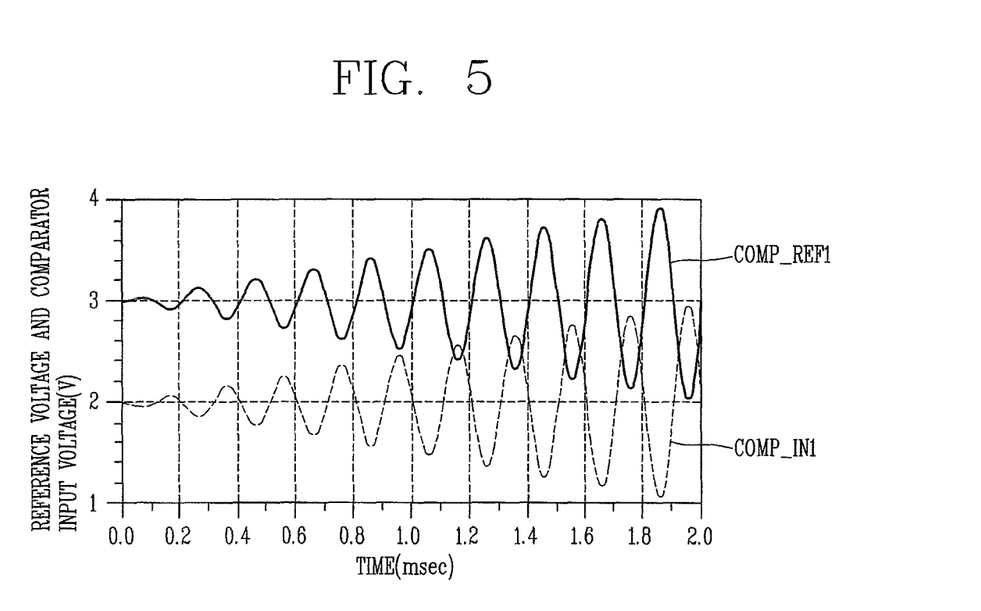
FIG. 5 is a waveform diagram illustrating the waveforms of a positive wave-period amplification signal and a positive wave-period reference voltage signal, which are a comparative input signal and a reference signal, respectively inputted to a positive wave-period comparator.

The waveform characteristics of the positive wave-period amplification voltage signal outputted from the positive wave-period amplification circuit section and the positive wave-period reference voltage signal, which is an AC input voltage signal for which the positive wave-period amplification voltage signal is divided to have a predetermined voltage difference, are alternating current (AC) waveforms, respectively, as illustrated in FIG. 5.

Figure 4:
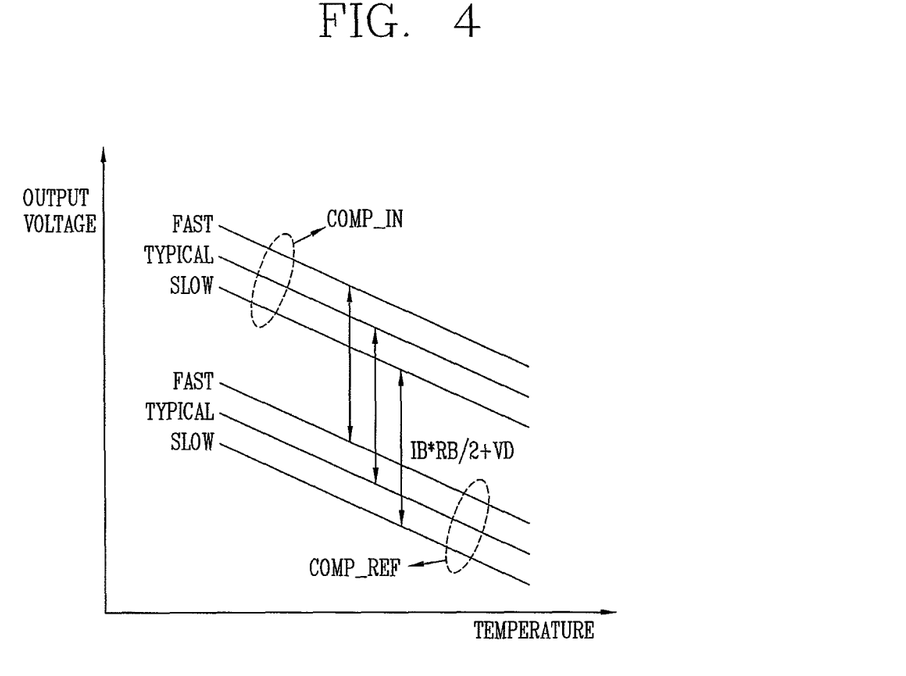
FIG. 4 is an operating characteristic diagram of a full-wave amplifier with respect to temperature and process speed variations illustrating that a difference value between a comparator input signal (positive wave-period or negative wave-period amplification signal) and a comparator reference voltage signal (positive wave-period or negative wave-period reference voltage signal) in the full-wave amplifier is predetermined regardless of the temperature and process speed variations.

Furthermore, referring to FIG. 4, which is an operating characteristic diagram of a full-wave amplifier with respect to temperature and process variations, in an abnormal current detection circuit for circuit breaker according to the present invention as described above with reference to FIGS. 1 and 2, a difference value between a comparator input signal (indicated by symbol COMP_IN in FIG. 4 as a positive wave-period or negative wave-period amplification signal) and a comparator reference voltage signal (indicated by symbol COMP_REF in FIG. 4 as a positive wave-period or negative wave-period reference voltage signal) outputted from the full-wave amplifier has a predetermined difference value (refer to a predetermined difference value shown as symbol IB*RB/2+VD in FIG. 4) regardless of temperature and process speed variations, i.e., FAST, TYPICAL, and SLOW production speeds. It provides an input signal and a reference voltage signal having a predetermined difference value to each other to the positive wave-period comparator and negative wave-period comparator at a next stage of the full-wave amplifier, thereby allowing the positive wave-period comparator and negative wave-period comparator to reliably provide a comparative output despite of temperature and process speed variations.

In FIG. 2, symbol BG is a bias voltage provided from the temperature compensating constant voltage circuit section 201 of FIG. 1 to drive a base of the fifth transistor Q5 and sixth transistor Q6, and a resistor RB is a current adjusting resistor for adjusting a value of the current flowing through the fifth transistor Q5 and sixth transistor Q6.

On the other hand, as described above, the positive wave-period amplification voltage signal and negative wave-period amplification voltage signal which have been amplified for a full-wave of the AC input voltage signal corresponding to an alternating current of the circuit subject to detection, and the positive wave-period reference voltage signal and negative wave-period reference voltage signal having a predetermined difference value from the voltage value of those amplification signals, are provided to the positive wave-period comparator 203 and negative wave-period comparator 204 as an input voltage signal and a reference voltage signal, respectively.

In FIG. 1, the positive wave-period comparator 203, connected to an output of the full-wave amplifier 202, 205, compares a positive wave-period amplification voltage signal and a positive wave-period reference voltage signal provided by the full-wave amplifier 202, 205 and outputs a pulse signal when the positive wave-period amplification signal is greater than or equal to the positive wave-period reference voltage signal.

Figure 6:
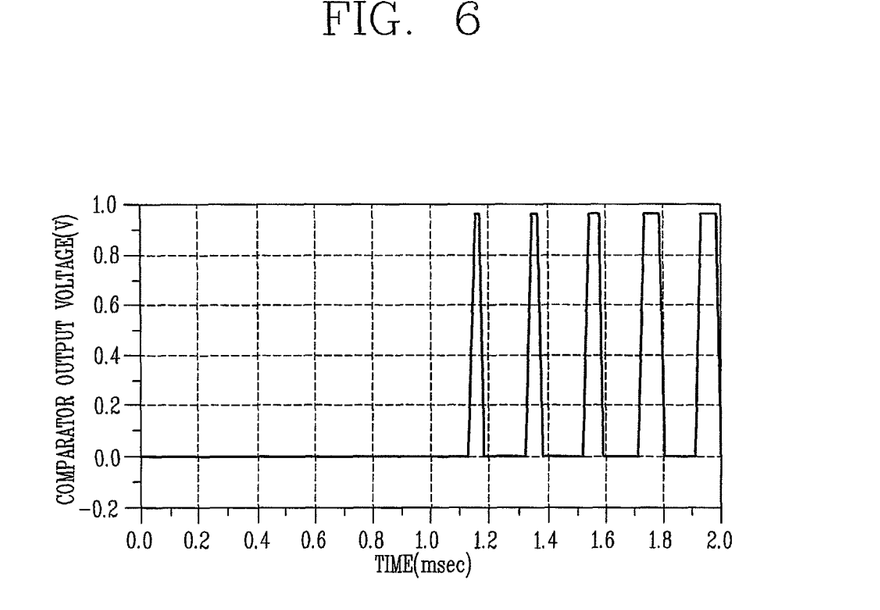
FIG. 6 is a waveform diagram illustrating the waveform of a pulse signal outputted from the positive wave-period comparator when the positive wave-period amplification signal is greater than or equal to the positive wave-period reference voltage signal in the waveforms of FIG. 5.

The operation may be confirmed by a waveform diagram of FIG. 5 illustrating the changed waveforms with respect to time for a positive wave-period amplification signal and a positive wave-period reference voltage signal, which are a comparative input signal and a reference signal, respectively inputted to a positive wave-period comparator, and a waveform diagram of FIG. 6 illustrating the waveform of a pulse signal outputted from the positive wave-period comparator when the positive wave-period amplification signal is greater than or equal to the positive wave-period reference voltage signal in the waveforms of FIG. 5.

In FIG. 5, it may be confirmed that a waveform of the input signal of the positive wave-period comparator (refer to reference numeral 203 in FIG. 1) indicated by symbol COMP_IN1 designates an alternating current waveform such as a sinusoidal wave depending on time variation as illustrated in the drawing, and a waveform of the reference voltage signal of the positive wave-period comparator (refer to reference numeral 203 in FIG. 1) indicated by symbol COMP_REF1 also designates an alternating current waveform such as a sinusoidal wave depending on time variation. In FIG. 5, the positive wave-period comparator (refer to reference numeral 203 in FIG. 1) outputs a pulse signal as illustrated in FIG. 6 for a period of time such that an input signal of the positive wave-period comparator (refer to reference numeral 203 in FIG. 1) indicated by symbol COMP_IN1, i.e., a positive wave-period amplification voltage signal, is greater than a value of the reference voltage signal of the positive wave-period comparator indicated by symbol COMP_REF1.

In FIG. 1, the negative wave-period comparator 204, connected to an output of the full-wave amplifier 202, 205, compares a positive wave-period amplification voltage signal and a positive wave-period reference voltage signal provided by the full-wave amplifier 202, 205 and outputs a pulse signal when the negative wave-period amplification signal is greater than or equal to the negative wave-period reference voltage signal.

In FIG. 1, the combining circuit 206, connected to an output of the positive wave-period comparator 203 and negative wave-period comparator 204, combines a pulse signal outputted from the positive wave-period comparator 203 with a pulse signal outputted from the negative wave-period comparator 204 to output a full-wave combining signal.

In FIG. 1, a second reference voltage generation circuit section 209, connected to a comparative driving circuit section 208 and a comparator 208a, generates a reference voltage signal for determining normality or abnormality of the input voltage signal corresponding to an AC input current subject to detection to provide the relevant reference voltage signal to the comparator 208a.

The capacitor (CH) connected to an output stage of the combining circuit 206, charges electric charges to provide a charge voltage during the time period of outputting the full-wave combining signal which is a pulse signal outputted from the combining circuit 206.

The comparative driving circuit section 208, connected to the second reference voltage generation circuit section 209 and the capacitor (CH), may include a comparative circuit section 208a and driving circuit section 208b. The comparative driving circuit section 208 compares a charge voltage provided by the capacitor with a reference voltage signal provided by the second reference voltage generation circuit section 209 using the comparative circuit section 208a, and outputs a driving signal for driving the driving circuit section 208b when the charge voltage is greater than or equal to the reference voltage signal. The driving circuit section 208b responds to a driving signal from the comparative circuit section 208a when the charge voltage is greater than or equal to the reference voltage signal and finally outputs a signal controlling the circuit breaker to be operated to a circuit breaking position. The control signal turns on a semiconductor switch (SCR) to magnetize the trip coil 300a, thereby triggering the switching mechanism 300b through an armature (not shown) as described above to be driven to a circuit breaking position (trip position). As a result, the switching mechanism 300b is driven to a circuit breaking position (trip position) to break the circuit, and thus it may be possible to protect the damage of an electrical load device, and a circuit line.

The abnormal current detection circuit 200 may further include a temperature compensating constant voltage circuit section 201 and a temperature compensating current source circuit 207.

Figure 3:
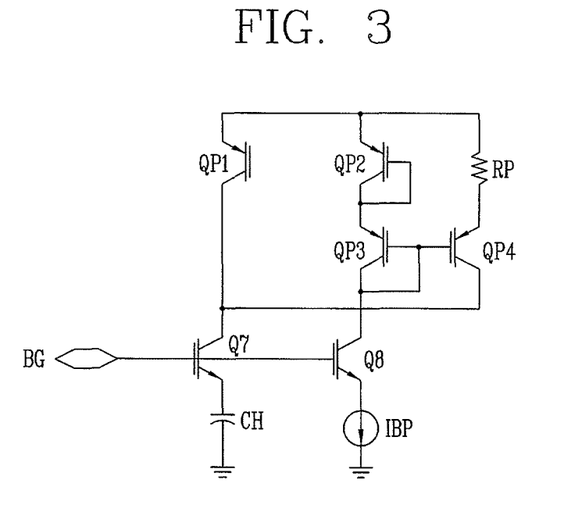
FIG. 3 is a detailed circuit diagram according to an embodiment of the present invention illustrating a temperature compensating current source of FIG. 1.

The temperature compensating constant voltage circuit section 201 as a circuit for supplying direct current power to constituent elements may be configured by comprising a constant voltage circuit, a switching element having a negative temperature coefficient, and a resistor and a switching element having a positive temperature coefficient. The temperature compensating constant voltage circuit section 201 may supply a predetermined bias voltage BG to a base of the transistors Q5, Q6, Q7, Q8 in the circuit as illustrated in FIGS. 2 and 3.

The temperature compensating current source circuit 207, connected between the capacitor CH and the combining circuit 206, supplies a temperature compensating current to the capacitor CH as a charge current while the combining circuit 206 outputs a combining signal as the pulse signal. The detailed configuration and operation of the temperature compensating current source circuit 207 will be additionally described below with reference to FIG. 3, which is a detailed circuit diagram of a temperature compensating current source in FIG. 1 according to an embodiment of the present invention.

The temperature compensating current source circuit may be configured by comprising a current source IBP, a negative temperature coefficient circuit section QP1, QP2, QP3, and a positive temperature coefficient circuit section RP, QP4. The temperature compensating current source circuit may be configured by further comprising a seventh transistor Q7 and an eighth transistor Q8 that perform a switching function for controlling to drive the negative temperature coefficient circuit section QP1, QP2, QP3, and the positive temperature coefficient circuit section RP, QP4.

The negative temperature coefficient circuit section QP1, QP2, QP3 may be configured with transistors QP1, QP2, QP3 having a negative temperature coefficient connected between the current source IBP and the capacitor CH.

The positive temperature coefficient circuit section RP, QP4, connected in parallel to the negative temperature coefficient circuit section QP1, QP2, QP3, may be configured by comprising a resistor RP and a transistor QP4 having a positive temperature coefficient.

The operation of the temperature compensating current source circuit 207 will be described below with reference to FIGS. 3 and 7.

Figure 7:
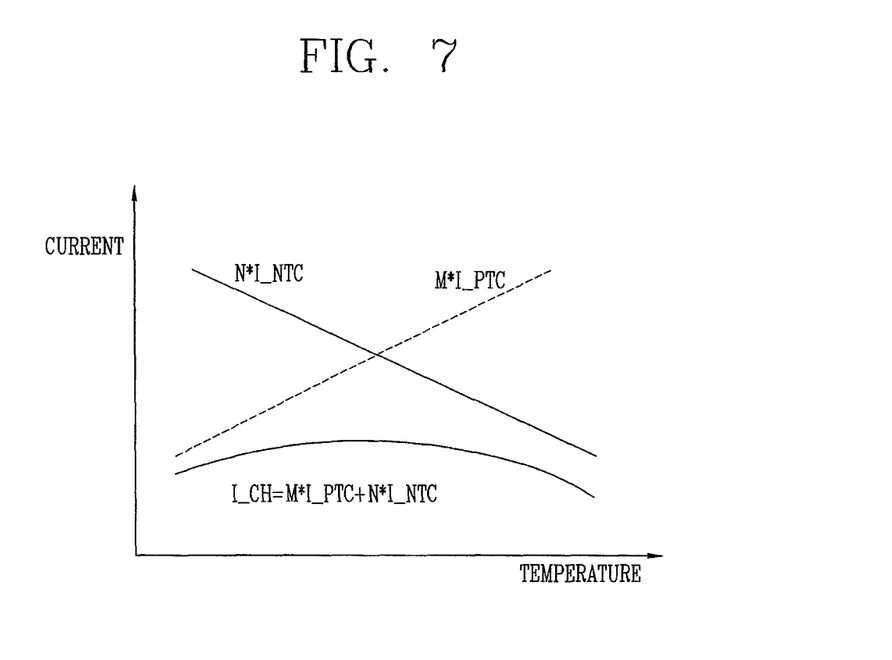
FIG. 7 is a waveform diagram illustrating the relation of a charge current of a temperature compensating current source circuit supplied to a capacitor to a current flowing through a device having a negative temperature coefficient and a current flowing through a device having a positive temperature coefficient in the temperature compensating current source circuit included in an abnormal current detection circuit for circuit breaker according to the present invention.

Referring to FIG. 7, a current flowing through the positive temperature coefficient circuit section (RP, QP4) shows a linear waveform in which the current value thereof increases as increasing the temperature as illustrated in a dotted line waveform indicated by symbol M*I_PTC. On the contrary, a current flowing through the negative temperature coefficient circuit section QP1, QP2, QP3 shows a negative temperature coefficient in which the current value thereof decreases as increasing the temperature as illustrated in a solid-line waveform indicated by symbol N*I_NTC. At this time, the resultant output current of the temperature compensating current source circuit 207 supplied to the capacitor CH will be supplied according to a curved waveform for which the variation thereof according to temperature variation is very smooth as indicated by symbol I_CH of FIG. 7.

On the other hand, the operation of a power circuit in which an abnormal current detection circuit for circuit breaker according to the present invention and a circuit breaker comprising the same is installed will be briefly described as follows.

An alternating current on a circuit subject to abnormal current detection flows from an alternating current (AC) power source 100 to an electrical load side. Accordingly, an abnormal current detection circuit for circuit breaker according to the present invention and a circuit breaker (particularly, electric leakage circuit breaker) comprising the same are installed in a circuit ranging from the AC power source 100 to the load side, and an amount of leakage current is detected by the zero-phase current transformer 102. Here, the zero-phase current transformer 102 may include a core through which a three-phase circuit is passed and a second coil wound around the core. When there is a leakage current, the sum of currents flowing through the three-phase circuit has a non-zero value, and thus an induction current due to the resultant current amount flowing through the three-phase circuit is induced and outputted to the second coil.

An AC leakage current signal detected and provided by the zero-phase current transformer 102 is outputted in a state that high-frequency noise is removed by the filter circuit 103, and converted into an AC input voltage signal by the resistor 101, and outputted to the abnormal current detection circuit for circuit breaker 200 according to the present invention.

The AC input voltage signal inputted to the abnormal current detection circuit for circuit breaker 200 according to the present invention outputs a positive wave-period amplification signal and a positive wave-period reference voltage signal such that a voltage value of the positive wave-period amplification signal and a voltage value of the positive wave-period reference voltage signal have a predetermined difference value, and outputs a negative wave-period amplification signal and a negative wave-period reference voltage signal such that a voltage value of the negative wave-period amplification signal and a voltage value of the negative wave-period reference voltage signal have a predetermined difference value, for a full-wave comprising a positive wave-period and a negative wave-period.

Subsequently, the positive wave-period comparator 203, connected to an output of the full-wave amplifier 202, 205, compares a positive wave-period amplification voltage signal with a positive wave-period reference voltage signal provided by the full-wave amplifier 202, 205, and outputs a pulse signal when the positive wave-period amplification signal is greater than or equal to the positive wave-period reference voltage signal. At the same time, the negative wave-period comparator 204, connected to an output of the full-wave amplifier 202, 205, compares a negative wave-period amplification voltage signal with a negative wave-period reference voltage signal provided by the full-wave amplifier 202, 205 and outputs a pulse signal when the negative wave-period amplification signal is greater than or equal to the negative wave-period reference voltage signal.

The combining circuit 206, connected to an output of the positive wave-period comparator 203 and negative wave-period comparator 204, combines a pulse signal outputted from the positive wave-period comparator 203 with a pulse signal outputted from the negative wave-period comparator 204 to output a full-wave combining signal.

Subsequently, the comparative driving circuit section 208, connected to the second reference voltage generation circuit section 209 and the capacitor (CH), compares a charge voltage provided by the capacitor with a reference voltage signal provided by the second reference voltage generation circuit section 209 using the comparative circuit section 208a, and outputs a driving signal for driving the driving circuit section 208b when the charge voltage is greater than or equal to the reference voltage signal. The driving circuit section 208b responds to a driving signal from the comparative circuit section 208a when the charge voltage is greater than or equal to the reference voltage signal, and finally outputs a signal controlling the circuit breaker to be operated to a circuit breaking position. The control signal turns on a semiconductor switch SCR to magnetize the trip coil 300a, thereby triggering the switching mechanism 300b through an armature (not shown) as described above to be driven to a circuit breaking position (trip position). As a result, the switching mechanism 300b is driven to a circuit breaking position (trip position) to break the circuit, and thus it may be possible to protect the damage of an electrical load device, and a circuit line.

As described above, an abnormal current detection circuit for circuit breaker according to the present invention can provide reliable abnormal current detection performance with respect to temperature and process speed variations, and thus it may be possible to obtain an effect of enhancing the operation reliability of a circuit breaker or leakage current circuit breaker employing the same.

An abnormal current detection circuit for circuit breaker according to the present invention may include a full-wave amplifier, and thus the generation of an abnormal current can be quickly detected, regardless whether a current detection signal inputted to a current transformer is in a positive wave-period or negative wave-period, thereby obtaining an effect of preventing the damage of an electrical load device, and a circuit.

According to an abnormal current detection circuit for circuit breaker according to the present invention, an inputted AC input voltage signal is amplified to be used as an input voltage signal of the comparator, and a reference voltage signal of the comparator having a predetermined difference value from a voltage value of the AC input voltage signal inputted to a voltage dividing circuit is also used, thereby obtaining an effect of generating a break signal to reliably drive a trip coil without varying sensitively depending on process or temperature variations.

According to an abnormal current detection circuit for circuit breaker according to the present invention, in a charging circuit of the capacitor, a capacitor charging current is supplied by a temperature compensating current source circuit comprising a circuit section having a negative temperature coefficient and a circuit section having a positive temperature coefficient, and accordingly, a combining output current of the circuit section having a negative temperature coefficient and the circuit section having a positive temperature coefficient which varies little with respect to temperature variation is supplied, thereby having an effect of securing more reliability in the operational characteristic of the abnormal current detection circuit depending on temperature variation.

What is claimed is:
1. An abnormal current detection circuit for circuit breaker, comprising:
a full-wave amplifier for amplifying an alternating current (AC) input voltage signal corresponding to a full-wave AC input current subject to detection, outputting a positive wave-period amplification voltage signal and a negative wave-period amplification voltage signal, and generating a positive wave-period reference voltage signal and a negative wave-period reference voltage signal having a predetermined difference value with respect to the amplified AC input voltage signal;

a positive wave-period comparator connected to an output of the full-wave amplifier to compare the positive wave-period amplification voltage signal with the positive wave-period reference voltage signal provided by the full-wave amplifier, and to output a pulse signal when the positive wave-period amplification voltage signal is greater than or equal to the positive wave-period reference voltage signal;

a negative wave-period comparator connected to an output of the full-wave amplifier to compare the negative wave-period amplification voltage signal with the negative wave-period reference voltage signal provided by the full-wave amplifier, and to output a pulse signal when the negative wave-period amplification voltage signal is greater than or equal to the negative wave-period reference voltage signal;

a combining circuit connected to the positive wave-period comparator and the negative wave-period comparator to combine a pulse signal output from the positive wave-period comparator with a pulse signal output from the negative wave-period comparator, to output a full-wave combining signal;

a reference voltage generator for generating a reference voltage signal to determine normality or abnormality of the input voltage signal corresponding to an AC input current subject to detection;

a capacitor connected to an output stage of the combining circuit to charge electric charges during the time period that a pulse signal is output from the combining circuit; and a comparative driving circuit section connected to the reference voltage generator and the capacitor to compare a charge voltage provided from the capacitor with a reference voltage signal provided from the reference voltage generator and to output a signal for controlling a circuit breaker to be driven to a circuit breaking position when the charge voltage is greater than or equal to the reference voltage signal, wherein the positive wave-period amplifier comprises:

a positive wave-period amplification circuit section for inputting an AC input voltage signal corresponding to a full-wave AC input current subject to detection, and amplifying positive wave-period input voltage signal of the input voltage signal to output a positive wave-period amplification voltage signal;

a negative wave-period amplification circuit section for amplifying a negative wave-period input voltage signal of the input voltage signal to output a negative wave-period amplification voltage signal;

a positive wave-period reference voltage generation circuit section for generating a positive wave-period reference voltage signal based on a positive wave-period input voltage signal of the input voltage signal; and a negative wave-period reference voltage generation circuit section for generating a negative wave-period reference voltage signal based on a negative wave-period input voltage signal of the input voltage signal, wherein the positive wave-period reference voltage generation circuit section and the negative wave-period reference voltage generation circuit section respectively comprise:

a voltage divider circuit section to have a predetermined difference value from a voltage value of the positive wave-period amplification signal or negative wave-period amplification signal outputted from the positive wave-period amplification circuit section or negative wave-period amplification circuit section, wherein the positive wave-period reference voltage generation circuit section and the negative wave-period reference voltage generation circuit are cross connected to the negative wave-period amplification circuit and the positive wave-period amplification circuit, thereby allowing the positive wave-period reference voltage generation circuit to be connected to the negative wave-period amplification circuit and allowing the negative wave-period reference voltage generation circuit to be connected to the positive wave-period amplification circuit.

2. The abnormal current detection circuit for circuit breaker of claim 1, wherein the positive wave-period amplification circuit section and the negative wave-period amplification circuit section respectively comprise:

a differential amplifier circuit; and a level shift circuit comprising a semiconductor switch and a resistor.

3. The abnormal current detection circuit for circuit breaker of claim 1, further comprising:

a temperature compensating current source circuit connected between an output stage of the combining circuit and the capacitor to supply a temperature compensating current to the capacitor as a charging current while the combining circuit outputs the pulse signal.

4. The abnormal current detection circuit for circuit breaker of claim 3, wherein the temperature compensating current source circuit comprises:

a current source;

a negative temperature coefficient circuit section connected between the current source and the capacitor to have a negative temperature coefficient; and a positive temperature coefficient circuit section connected in parallel to the negative temperature coefficient circuit section to have a positive temperature coefficient.

* * * * *